United States Patent [19]

Robertson, Jr.

[11] Patent Number: 5,372,532
[45] Date of Patent: Dec. 13, 1994

[54] SWIVEL HEAD CAP CONNECTOR

[76] Inventor: George W. Robertson, Jr., c/o Concept Plastics Inc., P.O. Box 321, Musquodoboit Harbour, Halifax, NS, Canada, B0J 2L0

[21] Appl. No.: 9,008
[22] Filed: Jan. 26, 1993
[51] Int. Cl.⁵ ............................. B63B 22/00
[52] U.S. Cl. ............................. 441/1; 411/419
[58] Field of Search ............... 114/343, 221 R, 219, 114/218; 441/1; D8/367; 411/378, 419, 81

[56] References Cited

U.S. PATENT DOCUMENTS

| | | | |
|---|---|---|---|
| 1,320,604 | 11/1919 | Dame | 441/1 |
| 3,799,098 | 3/1974 | Taylor et al. | 114/219 |
| 4,628,850 | 12/1986 | Day et al. | 114/219 |
| 4,875,427 | 10/1989 | Harris, Jr. | 114/219 |

Primary Examiner—Stephen P. Avila
Attorney, Agent, or Firm—Jones, Tullar & Cooper

[57] ABSTRACT

A swivel head cap assembly can be threadedly attached to an empty plastic pop bottle to create a float or buoy. The assembly includes a cap that is attachable to the bottle, the cap including an annular collar spaced from the cap by a pair of integrally moulded legs. A separate eyebolt member has an annular eyebolt portion and a shaft portion extending radially therefrom, the shaft portion being receivable in the collar of the cap. A separate securing member is provided to prevent unwanted disconnection of the eyebolt member from the cap. The eyebolt member can rotate or swivel relative to the cap and a rope or chain can be connected at one end to the eyebolt portion and at the other end to a net or other underwater structure. Bottles that would otherwise be destined for the garbage pile or landfill site can be utilized with the invention to provide inexpensive, easily replaced, floats or buoys for any number of marine applications.

7 Claims, 5 Drawing Sheets

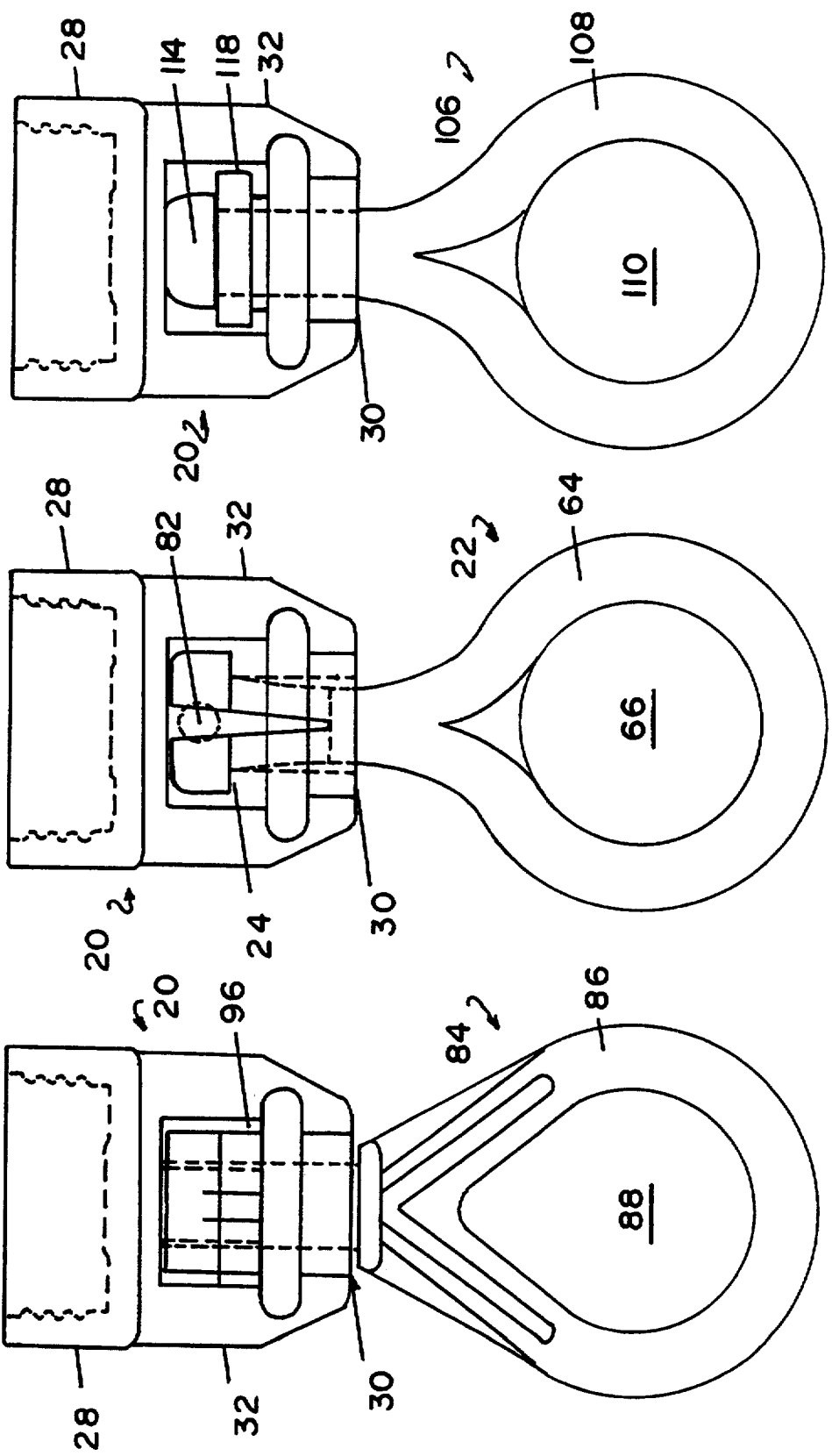

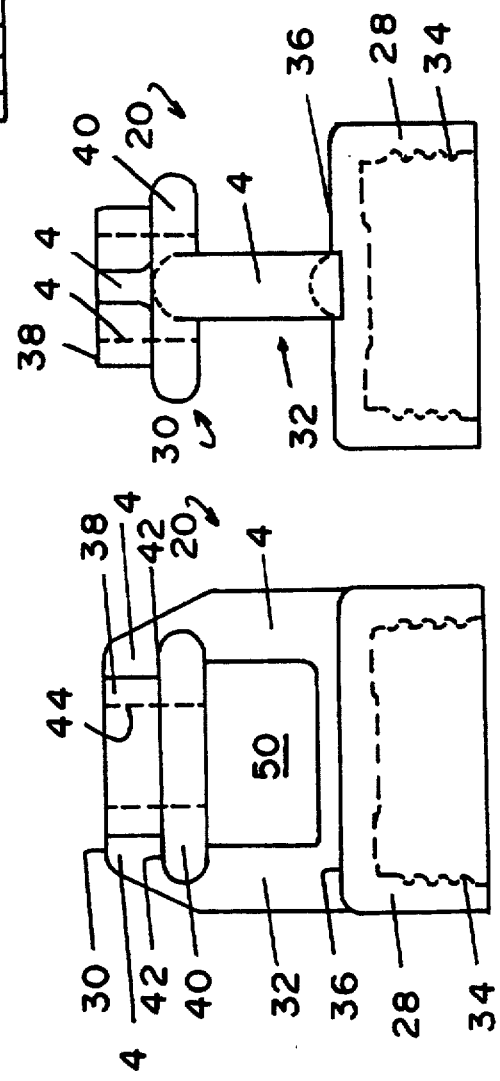

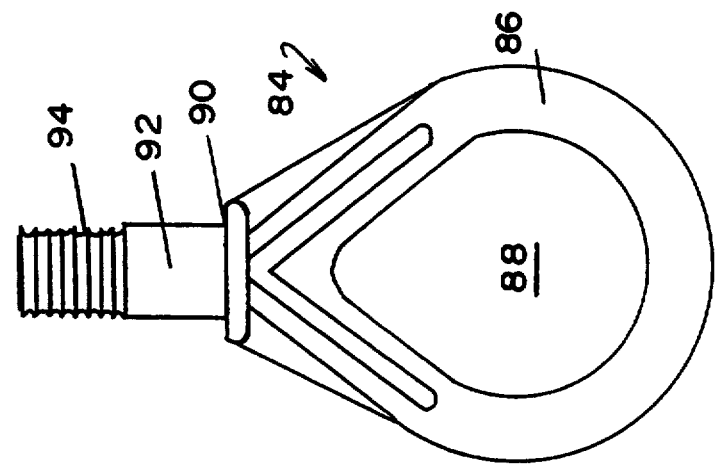
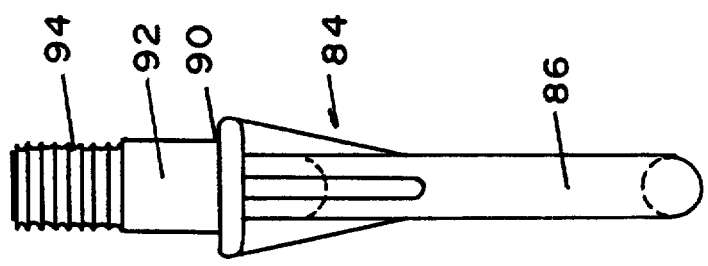
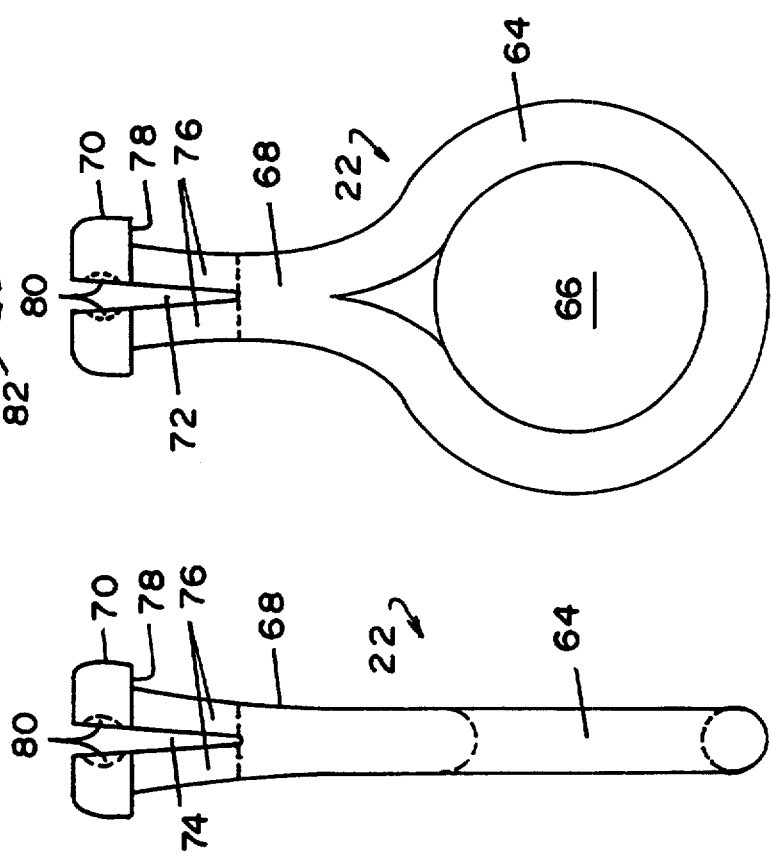

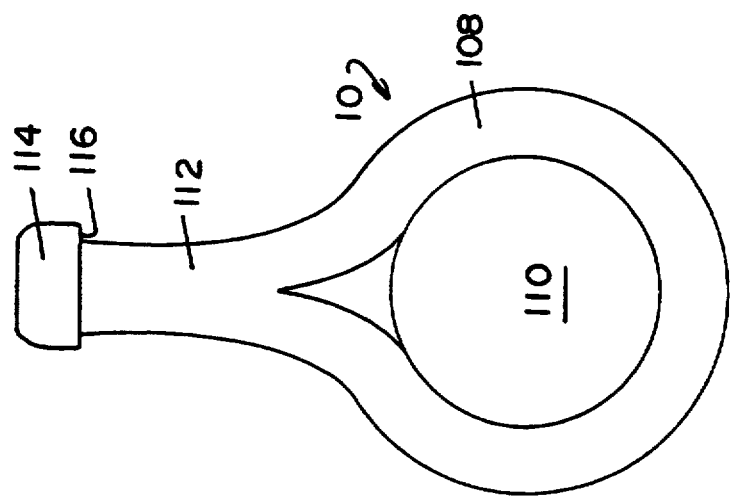
FIG. 19
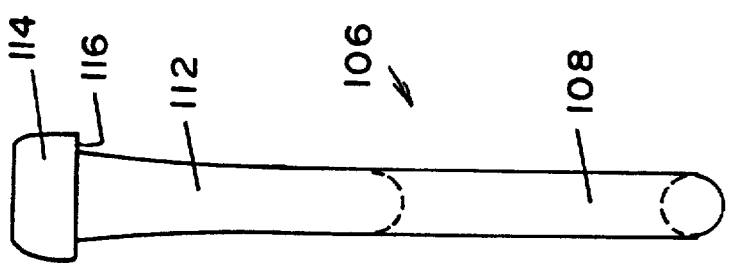
FIG. 20
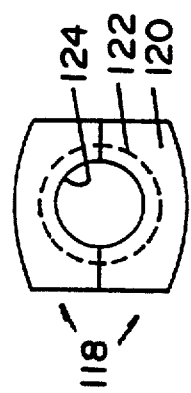
FIG. 22
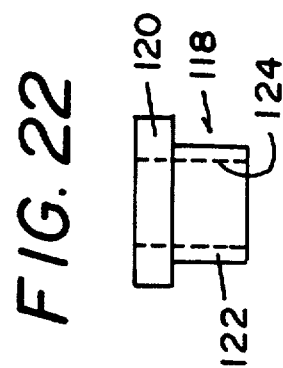
FIG. 21
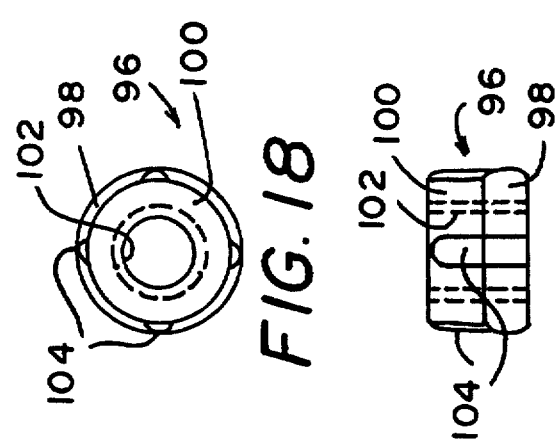
FIG. 18
FIG. 17

SWIVEL HEAD CAP CONNECTOR

The present invention relates to plastic molded bottles in general and to a swivel cap connector therefor in particular.

BACKGROUND OF THE INVENTION

There is a considerable requirement for floats or buoys in maritime industries, whether fresh water or salt water. Floats are used to suspend fishing nets within a body of water; they are used to suspend shellfish collectors in water for shellfish aquaculture; they are used to mark or identify particular fishing waters or navigational hazards; they are used to anchor boats at a particular location if they themselves are anchored to the bottom, for example; they can be coloured to identify property belonging to particular individuals; they can be used to suspend hoses or cables leading from an onshore installation to an offshore location; or they can be put to recreational purposes, defining a course for racing boats or water-skiers.

No matter what the end use thereof, a float or a buoy always entails a floating member and a mechanism for anchoring the float to something else, whether a net, collector, or other suspended article, to the bottom of a body of water, or to something adjacent the bottom, such as a shipwreck. The floating member is often made from a buoyant material per se, such as wood, or it involves a sealed container having air trapped therein. In any event most commercially available buoys of floats tend to be well-made, rugged, long-lasting, and, accordingly, very expensive.

Many cottagers make their own floats or buoys from discarded blow molded bottles of the 2 to 4 liter variety, which bottles commonly have a handle integrally molded thereon for carrying purposes. A marker buoy, for example to identify the location of a hazardous rock or to pinpoint the location of the end of a water hose, can be readily prepared by securing the original cap to such a bottle and tying a length of rope to the handle, with a brick at the other end of the rope for anchoring the buoy at its desired location. In time however, water leaks into the bottle and it will settle deeper in the water, becoming less visible and hence less effective. Such a buoy does not float in a true vertical orientation because of the offset nature of the integral handle.

There is a need for a very inexpensive float or buoy that can be easily replaced if necessary and which will be as effective as commercially available buoys or floats and equal to the hand-made floats or buoys in convenience and cost. A particularly useful article for such a buoy or float is the popular and abundantly available PET (polyethyleneteraphthalate) bottle commonly found in a 2 liter size and containing soft drink. Such bottles are available in a variety of colours; they are of a good size for the intended purpose; and they are available free of charge, being garbage after one has consumed the contents thereof. Furthermore, they are not biodegradable and unless a community has an active recycling programme such bottles will end up in landfill to the benefit of no one. The only problem with using such bottles as floats or buoys is the lack of a handle thereon or any convenient mechanism for attaching an anchor rope thereto.

SUMMARY OF THE INVENTION

The present invention provides a solution to the handle problem mentioned above so that handleless PET bottles can be used as floats or buoys. In essence the invention provides a cap and eyebolt connector combination that can be assembled to any such container having a threaded neck so that a rope or chain can be attached to the eyebolt for attachment to any other anchoring device, such as a net. The cap has a main body portion containing an internally threaded section for threaded attachment to the bottle. The cap also carries an annular collar or ring spaced from the main body portion by a pair of legs so that there is a space or gap between the main body and the annular ring. The eyebolt member includes an annular eyebolt portion and a shaft extending radially therefrom for reception through the annular ring of the cap. Securing means are provided to connect the shaft portion of the eyebolt member to the cap so that the eyebolt member is capable of rotating relative to the cap. By simply attaching the connector of the present invention to a blow molded bottle, or to any other light weight bottle having a suitable threaded neck, one can achieve an effective buoyant device suitable for use as a float or a buoy. An anchor rope can be connected to the eyebolt member and then to a net or other anchoring member. The bottle will float in an inverted upright orientation, as desired, and by allowing the eyebolt to swivel relative to the cap there will be fewer problems occasioned by twisting of the rope or the action of the waves.

Broadly speaking, therefore the present invention may be considered as providing a connector for attachment to a bottle having a threaded neck comprising: a threaded cap member for sealing threaded coupling to the threaded neck of the bottle, the cap member including a main body portion, annular collar means, and standoff means positioning the collar means spaced from the main body portion; an eyebolt member including a generally annular eyebolt portion and a shaft portion extending radially from the eyebolt portion, the shaft portion being rotatably receivable within the collar means; and securing means for retaining the eyebolt member in connection with the collar means and permitting rotation of the eyebolt member relative to the cap member.

Other aspects and features of the present invention will be described hereinbelow with reference to the drawings.

BRIEF DESCRIPTION OF THE DRAWINGS

FIG. 2, 3 and 4 show first, second and third assemblies, respectively, of the present invention.

FIG. 5, 6 and 7 show front, side, and top views of a first cap member.

FIGS. 8, 9 and 10 show front, side and top views of a second cap member.

FIGS. 11, 12 and 13 show front side and end views of a first eyebolt member.

FIG. 14 shows a view of a securing means for the first eyebolt member.

FIGS. 15, and 16 show front and side views of a second eyebolt member.

FIGS. 17 and 18 show side and top views of a securing means for the second eyebolt member.

FIGS. 19 and 20 show front and side views of a third eyebolt member.

FIGS. 21 and 22 show side and top views of a securing means for the third eyebolt member.

DESCRIPTION OF THE PREFERRED EMBODIMENTS

Figure 1:
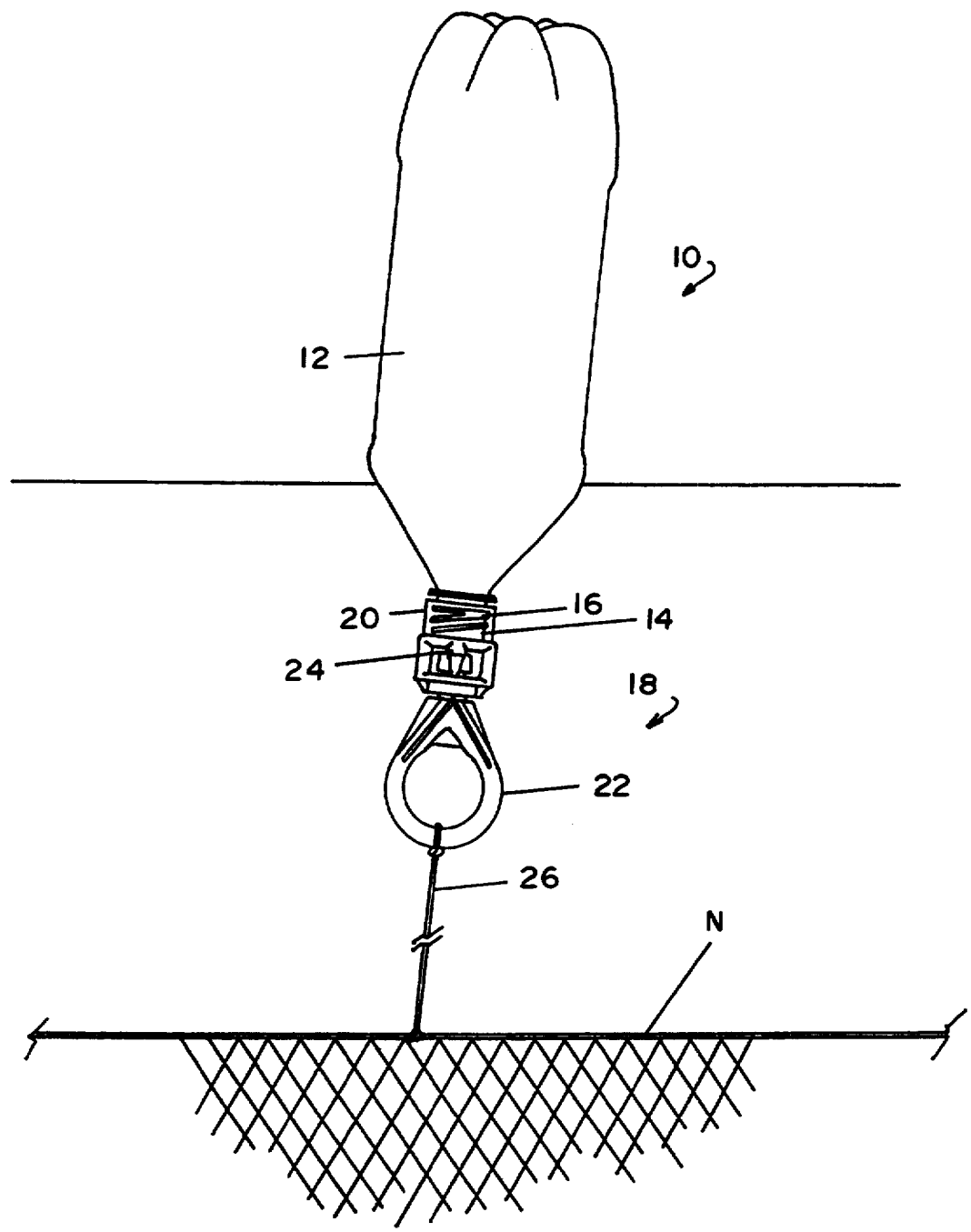
FIG. 1 illustrates a PET bottle being used as a float and provided with a swivel head cap connector of the present invention.

FIG. 1 shows a 2 liter PET bottle 10 such as might have contained soda pop in its original configuration. The bottle has a body 12 and a threaded neck 14, the neck having external threads 16 thereon. A swivel head cap connector 18 of the present invention is threadedly attached to the threaded neck of the bottle, the connector exhibiting a cap member 20, and an eyebolt member 22. Means 24 are provided to secure the eyebolt member to the cap member such that the eyebolt member can swivel or rotate relative to the cap member. A rope 26 is shown as attached at one end thereof to the eyebolt member 22 and at the other end to a net N.

FIGS. 5, 6 and 7 illustrate the cap member 20 shown in FIGS. 1 and 2-4. The cap member has three portions, namely a main body portion 28, a collar portion 30 and a standoff portion 32. The main body portion 28 is generally cylindrical in configuration and is provided with an internally threaded portion 34, having a pitch and diameter identical to that provided on the bottle neck to which the assembly is to be attached. Although not shown in the drawings a sealing ring can be inserted into the threaded portion for sealing engagement with the end of the bottle neck. Spaced above the upper surface 36 of the main body portion 28 is the collar portion 30. The collar portion 30 includes an annular ring section 38 and a lower strengthening flange section 40. The flange section has an almost elliptical appearance, with diametrically opposed wing portions 42 extending outwardly almost to the full diameter of the main body portion 28. A bore 44 extends through the ring section 38 and the flange section 40 and is collinear with the central axis of the main body portion 28.

The collar portion is supported by the standoff portion 32, which in the present embodiment is shown as a pair of diametrically opposed legs 46 extending upwardly away from the end surface 36 of the main body portion 28. The legs may be circular in cross-section or they can have any other configuration that is easily moulded. Reinforcing buttresses 48 may be provided to strengthen the annular ring section 38. A space 50 is defined by the legs 46, the surface 36, and the underside of the collar portion 30, in which space the securing means of the invention will be located, as seen in FIGS. 2-4.

FIGS. 8-10 illustrate another cap member 52, this one being useful for bottles having a threaded neck of a diameter smaller than those with which the cap member of FIGS. 5-7 is commonly used. In this embodiment the main body portion 54 has a small diameter and the internally threaded portion 56 is also of a smaller diameter. The collar portion 58 is essentially the same as the collar portion 30 and need not be described further herein. Similarly the standoff portion 60 is essentially the same as the standoff portion 32, the only exception being in the manner in which the legs are connected to the main body portion. As with the cap member 20, there is a space 62 defined by the legs, the collar portion and the main body portion.

Both cap members 20 and 52 may be integrally moulded from a suitable plastics material, as by injection moulding. Preferably the moulding material will be one that is not adversely affected by salt or fresh water.

FIGS. 2 and 11-13 illustrate a first embodiment of an eyebolt member that forms part of the present invention and can be used with either of the cap members 20 or 52. The eyebolt member 22 includes a generally annular eyebolt portion 64, defining a generally circular opening 66, and a shaft portion 68 extending generally radially from the eyebolt portion 64. The eyebolt and shaft portions are integrally moulded together and suitable strengthening and reinforcing fillets, as well as smooth contours and transitions, as shown in the drawings, may be provided, all in accordance with standard moulding techniques.

The shaft portion 68 has an enlarged diameter head portion 70 at the free end thereof. Additionally, a pair of orthogonal slits 72,74 extend inwardly from the free end of the shaft portion, through the head portion 70, and along a short length of the shaft portion. The slits 72,74 create four branches 76 of the shaft portion, which branches tend to separate or move apart after cooling from the mould as seen in FIGS. 11 and 12. Because of the resiliency of the moulding material the branches 76 can be squeezed together to bring the branches into close proximity to each other. In this configuration the head portion 70 can be pushed through the bore 44 in the collar portion 30 of either cap member 20 or 52. Once through the bore, the branches 76 will spread slightly, returning towards their post-moulding configuration. The shoulder 78 at the juncture of the head and shaft portion will abut against the underside of the flange section 40 to deter unwanted withdrawal of the eyebolt member 22 from the cap member 20 or 52.

A securing means is provided to ensure that the shaft portion 68 is not inadvertently removed from the cap member under the effects of a strong pull from the rope or chain attached to the eyebolt portion 64. The securing means in this instance involves a generally quarter-spherical recess 80 formed in the lengthwise corner of each branch 76 in the vicinity of the head portion 70 such that when the branches are squeezed together the recesses 80 will form a generally spherically shaped total recess. After the shaft portion 68 has been inserted through the bore 44 a spherical ball 82 (FIG. 14) is pushed into the free end of the shaft portion 68 at the juncture of the slits 72 and 74, effectively spreading the branches 76 further until the ball 82 comes to rest in the recess defined by the recesses 80. The ball is captured by the recesses 80 and prevents the branches 76 from being squeezed together enough to permit removal through the bore 44. If removal becomes necessary one can extract the ball 82 from the recesses 80 with a knife blade or other narrow implement.

When the eyebolt member 22 is connected to the cap member 20 or 52, with or without the ball 82 in place, it is free to rotate relative to the cap member and any bottle to which the cap member may be attached.

FIGS. 3, 15 and 16 illustrate a second eyebolt member that can be used with either of the previously described cap members. The eyebolt member 84 includes a generally annular eyebolt portion 86 defining a generally circular opening 88. Again, the configuration of the eyebolt portion is not critical to the invention. The eyebolt member 84 does include, however, a generally tangential flange 90 that acts as a beating surface, and normal to the flange 90 a shaft portion 92 projects radially from the eyebolt member 84. The shaft portion 92 includes a threaded section 94 adjacent the free end thereof. The diameter of the shaft portion 92 and the threaded section 94 is such as to permit a sliding fit through the bore 44 in the cap member 20 or 52.

Securing means for this embodiment takes the form of a moulded nut 96, shown in FIGS. 16 and 17. The nut 96 is generally of a stepped cylindrical shape, with a larger diameter portion 98 and a smaller diameter portion 100. The nut has a central threaded bore 102 for threaded engagement with the threaded section 94 of the shaft portion 92 and a plurality of circumferentially spaced longitudinally extending surface ribs 104 that provide a means for gripping the nut and effecting the desired turning forces when the nut is attached to the threaded section 94. The length of the nut 96 is such that it will fit conveniently and without interference in the space 50 or 62 provided in the cap member 20 or 52. In order to assemble the eyebolt member 84 to either cap member the threaded section 94 and the shaft section 92 are pushed through the bore 44 so that the threaded section enters the space 50 or 62. The nut is placed in the space and is threaded onto the threaded section during insertion until the flange 90 is brought into proximity with the top surface of the collar portion 30 or 58. The eyebolt member is thus secured to the cap member by the nut 96 but it is still free to swivel or rotate relative to the cap member.

FIGS. 19 and 20 illustrate a third eyebolt member 106 having, as before a generally annular eyebolt portion 108 defining a generally circular opening 110. A shaft portion 112 extends generally radially away from the eyebolt portion and is provided with an enlarged diameter head portion 114 that is sized for a force fit through the bore 44 of one of the cap members 20 or 52.

Once the eyebolt member 106 is assembled to a cap member the shoulder 116 will tend to thwart unwanted withdrawal of the shaft portion from the collar portion. However, it is desirable to secure the eyebolt member to the cap member and this is ensured by the securing clips 118 shown in FIGS. 4, 20 and 21. Each clip 118 forms half of the securing means and conventional snap-fastener means may be used to attach the clips together. When assembled the clips exhibit a large diameter flange section 120 that will be engageable with the underside of the head portion 114, a smaller diameter section 122, and a through bore 124. The clips are clampable about the shaft portion 112 exposed within the space 50 or 62 of the cap member 20 or 52 between the head portion 114 and the flange 40. Thus, unwanted disengagement between the cap member and the eyebolt member is prevented without affecting the rotatability of the eyebolt member 114 relative to the cap member.

The present invention may be sold as single packages containing two cap members (of different thread sizes) and one of the eyebolt members, with suitable securing means therefor. The consumer will select the appropriate cap member, attach it to a selected bottle and then assemble the eyebolt member to the cap member, using the securing means to ensure that the eyebolt member will not accidentally detach itself from the cap member during use. This will result in a cap assembly as shown in one of the FIGS. 2, 3 or 4. A rope or chain may then be attached to the eyebolt member in any conventional manner and attached as well to a net or any other suitable structure so that the capped bottle may then be used as a float or buoy.

Should the bottle be damaged and rendered unserviceable the cap assembly can be removed therefrom and attached to a replacement bottle. As indicated above, such bottles are very common and readily available almost at any time. A single cap assembly in accordance with the present invention could have a service life of several years, notwithstanding its utilization with a plurality of bottles. Clearly the present invention provides a new use for discarded pop bottles and the like, extending the life thereof and delaying the entrance of such bottles into landfill sites.

The foregoing has described the best modes of putting the invention into effect known at the present time. It is understood that a skilled practitioner could effect changes to the disclosed structures without departing from the spirit of the invention. Uses other than those contemplated herein are also possible, including uses that do not pertain to floats or buoys. For example, the cap assembly of the present invention could be attached to bottles that could then be hung from trees as decorative ornaments or made into bird feeders. Accordingly the protection to be afforded the present invention is to be ascertained from the claims appended hereto.

I claim:

1. A connector for attachment to a bottle having an externally threaded neck comprising: a cap member including a main body portion having an internally threaded portion for sealing threaded coupling to the threaded neck of the bottle, said threaded portion having an axis, standoff means including a pair of spaced apart legs extending away from said main body portion, and a generally annular ring attached to outer ends of said legs and having an axis collinear with the axis of said internally threaded portion; an eyebolt member including a generally annular eye portion and a shaft portion extending radially from said eyebolt portion and having a free end, said shaft portion having an enlarged diameter head portion at the free end thereof, which head portion is sized for a tight fit through said annular ring with said shaft portion being rotatably receivable within said annular ring; and securing means for retaining said eyebolt member in connection with said annular ring and permitting rotation of said eyebolt member relative to said cap member.

2. The connector of claim 1, further including a pair of orthogonal slits extending axially from the free end of said shaft portion, through said head portion and a short distance along said shaft portion, defining a slit section; and wherein said securing means comprises means for spreading said slit section of said shaft portion following insertion of said head portion through said annular ring to prevent unwanted disconnection of said eyebolt member from said cap member.

3. The connector of claim 2 wherein said means for spreading comprises a generally spherical recess provided within said slits at said head portion and a spherical ball member retentatively positionable within said recess following insertion of said head member through said annular ring.

4. The connector of claim 1 wherein said securing means comprises a pair of mating clip sections clampable about said shaft portion between said head portion and said annular ring within a space defined by said legs, said main body portion and said annular ring to prevent unwanted disconnection of said eyebolt member from said cap member.

5. A connector for attachment to a bottle having a threaded neck for conversion of the bottle into a float comprising: a threaded cap member for sealing threaded coupling to the threaded neck of the bottle, said cap member including a main body portion, annular collar means, and standoff means positioning said collar means spaced from said main body portion; an eyebolt member including a generally annular eye portion and a shaft portion extending radially from said eyebolt portion, said shaft portion having an enlarged diameter head portion at the free end thereof and a pair of orthogonal slits extending axially through said head portion for a short distance along said shaft portion, defining four branches of said shaft portion, said shaft portion being rotatably receivable within said collar means; and securing means for retaining said eyebolt member in connection with said collar means and permitting rotation of said eyebolt member relative to said cap member, said securing means including a generally spherical recess within said slits at said head portion and a spherical ball member retentatively positionable within said recess following insertion of said head portion through said collar means to spread said branches and prevent unwanted disconnection of said eyebolt member from said cap member.

6. A connector for attachment to a bottle having a threaded neck comprising: a threaded cap member for sealing threaded coupling to the threaded neck of the bottle, said cap member including a main body portion, annular collar means, and standoff means positioning said collar means spaced from said main body portion; an eyebolt member including a generally annular eye portion and a threaded shaft portion extending radially from said eyebolt portion, said threaded shaft portion being rotatably receivable within said collar means; and securing means for retaining said eyebolt member in connection with said collar means and permitting rotation of said eyebolt member relative to said cap member, said securing means comprising an internally threaded nut threadably engageable with said threaded shaft portion within a space defined by said main body portion, said standoff means and said collar means to prevent unwanted disconnection of said eyebolt member from said cap member.

7. A connector for attachment to a bottle having a threaded neck comprising: a threaded cap member for sealing threaded coupling to the threaded neck of the bottle, said cap member including a main body portion, annular collar means, and standoff means positioning said collar means spaced from said main body portion; an eyebolt member including a generally annular eye portion and a shaft portion extending radially from said eyebolt portion, said shaft portion having a enlarged diameter head portion at the free end thereof and being rotatably receivable within said collar means; and securing means for retaining said eyebolt member in connection with said collar means and permitting rotation of said eyebolt member relative to said cap member, said securing means comprising a pair of matable clip sections clampable about said shaft portion between said head portion and said collar means within a space defined by said main body portion, said standoff means and said collar means to prevent unwanted disconnection of said eyebolt member from said cap member.

* * * * *